United States Patent [19]

Endo

[11] Patent Number: 4,642,703
[45] Date of Patent: Feb. 10, 1987

[54] INFORMATION RECORDING-REPRODUCING METHOD AND APPARATUS

[75] Inventor: Kiyonobu Endo, Yokohama, Japan
[73] Assignee: Canon Kabushiki Kaisha, Tokyo, Japan
[21] Appl. No.: 565,366
[22] Filed: Dec. 27, 1983
[30] Foreign Application Priority Data
Dec. 28, 1982 [JP] Japan ............................ 57-230778
[51] Int. Cl.⁴ .......................... G11B 7/00; G11B 11/00
[52] U.S. Cl. .................................. 358/342; 358/102; 360/114; 369/13
[58] Field of Search ............... 358/335, 342, 903, 102; 360/55, 114, 1, 2, 72.1, 72.2; 369/13

[56] References Cited

U.S. PATENT DOCUMENTS

| | | | |
|---|---|---|---|
| 4,417,282 | 11/1983 | Yamamoto | 360/79 X |
| 4,485,454 | 11/1984 | Kimoto | 364/900 |
| 4,498,107 | 2/1985 | Yoshimaru et al. | 358/903 |
| 4,506,342 | 3/1985 | Yamamoto | 358/903 X |
| 4,513,406 | 4/1985 | Ishihara | 369/32 |

*Primary Examiner*—Robert L. Richardson
*Attorney, Agent, or Firm*—Fitzpatrick, Cella, Harper & Scinto

[57] ABSTRACT

An information recording-reproducing method of recording information from a plurality of information sources on a recording medium and reproducing the information is characterized by dividing the information from each information source into a plurality, recording the divided information from the first information source along the signal tracks of the recording medium at predetermined intervals, recording the divided information from the other information sources between recording areas in which the divided information from the first information source is recorded, and reproducing the information along the signal tracks.

5 Claims, 15 Drawing Figures

INFORMATION RECORDING-REPRODUCING METHOD AND APPARATUS

BACKGROUND OF THE INVENTION

1. Field of the Invention

This invention relates to an information recording-reproducing method and apparatus used for the filing or the like of documents, and is particularly suitable for effecting recording and reproduction using optical discs or the like.

2. Description of the Prior Art

As the means for accumulating information, such as documents and outputs of computers, there are well known information recording-reproducing apparatuses using a semiconductor memory, a magnetic tape, a magnetic disc or the like as a recording medium. In recent years, along with the progress of the information society, increasing the capacity of such recording-reproducing apparatuses has been extensively studied. In particular, those apparatuses which use an optical disc as a recording medium have very promising in that they are excellent information recording density, that the recording-reproducing head is out of contact with the recording medium and this eliminates the possibility of the recording medium and head beng abraded and that the development of magneto-optic materials has made erasing and re-recording possible.

On the other hand, along with the aforementioned tendency of the information recording-reproducing apparatuses toward greater capacities, several search systems for quickly reading out recorded information have been proposed.

The most popular search system uses a separate recording means, such as a mini-floppy disc, and according to this search system, the title, address numbers, etc. of the information recorded on the recordng medium are recorded on the mini-floppy disc or the like and in the case of information search, the title and the address number list are first read out, and then the address number of the information which it is desired to reproduce is selected and reproduced. There are also systems wherein an area in which only the title of information and the address number list are recorded and an area in which the information is recorded are provided on a recording medium and in the case of search, the title and the address number list are read out and the address number of the information which it is desired to reproduce is selected and reproduced.

However, the apparatuses having the separate recording means for searching, as described above, have suffered from problems with respect to the complication, bulkiness and cost of the apparatus, and the method of providing the areas of search information on the recording medium has suffered from a problem that the title and the address number are recorded at two locations and this leads to reduced recording capacity.

Further, even where the search systems as described above are adopted, when the title of desired information is unclear or when it is desired to find out only a necessary portion from the information searched by the title, there has been a desire to directly see the recorded information and moreover quickly search it.

SUMMARY OF THE INVENTION

It is an object of the present invention to provide an information recording-reproducing method and apparatus which enable information to be searched without complicating and making bulky the apparatus and without the recording capacity of the apparatus being reduced.

It is another object of the present invention to provide an information recording-reproducing method and apparatus which enable one to rapidly search recorded information while directly seeing it.

The present invention achieves the above objects by making such a design, in an information recording-reproducing method and apparatus for recording information from a plurality of information sources on a recording medium and reproducing the information, that the information from each information source is divided into a plurality of segments spaced at predetermined intervals. The information from the first information source is recorded along the signal tracks of the recording medium at predetermined intervals, and the information from the other information sources is recorded between recording areas in which the information from the first information source is recorded, and is reproduced along the signal tracks.

The invention will become more fully apparent from the following detailed description thereof taken in conjunction with the accompanying drawings.

DESCRIPTION OF THE PREFERRED EMBODIMENT

Figure 1:
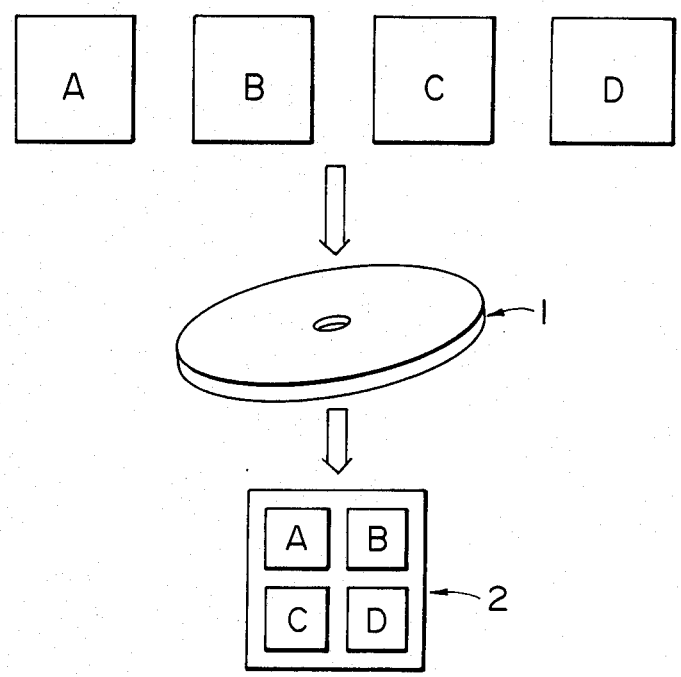
FIG. 1 is a schematic view illustrating an example of the output based on the information recording-reproducing method of the present invention.

Referring to FIG. 1 which is a schematic view illustrating an example of the output based on the information recording-reproducing method of the present invention, reference numeral 1 designates a recording medium and reference numeral 2 denotes a picture plane. Originals A, B, C and D recorded on the recording medium 1 are reduced in size and put out into a picture plane.

The example of FIG. 1 is one in which information written on the four originals A-D is read by a reading system to be described and is recorded onto the recording medium 1 and the information from the recording medium 1 is reproduced and is displayed on the picture plane 2 or printed out on a sheet of paper with the originals A-D arranged. Description is made on the basis of four originals A-D, but this is for the sake of convenience and the number of originals is not restricted thereto. The information is put out onto several sheets of a certain limited space and therefore, the initial originals A-D are reduced in size, but the four originals can be looked over at a glance and a desired original can be quickly searched. The desired original is often remembered by heart and therefore, even if it is reduced in size, it will offer no problem.

After the desired original has been located by search, an original on which desired information is recorded is selected from among the originals A-D put out onto the picture plane 2 or a sheet of paper, and the desired information is put out at the normal size (the size which enables even the details to be read).

Figures 2A, 2B:
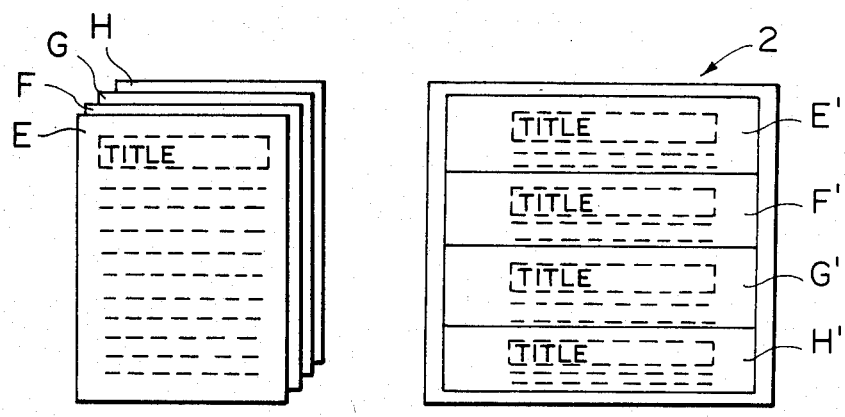
FIGS. 2A and 2B are schematic views illustrating other examples of the output based on the information recording-reproducing method of the present invention.

Reference is now made FIG. 2 to describe another example of the output based on the information recording-reproducing method of the present invention. E, F, G and H designate originals, and E', F', G' and H' are the information of five lines (including the title) from each of the originals E-H. The difference of this example from the example of FIG. 1 is that up to the fifth line of each of the originals E-H is put out onto the picture plane 2 or a sheet of paper to enable a desired original to be searched from the information of five lines. By seeing the first several lines of an original, it can be judged whether that original is a desired original and therefore, a plurality of originals can be fed at a time to quicken the search. This is particularly effective for the example in which, as shown in FIG. 2, a title or the like is written in the first line of the original.

Figure 3:
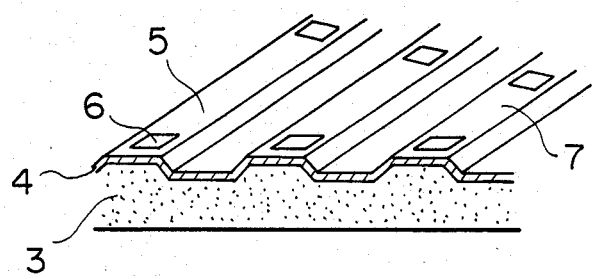
FIG. 3 is an enlarged perspective view of a recordng medium used in the present invention.
Figure 4:
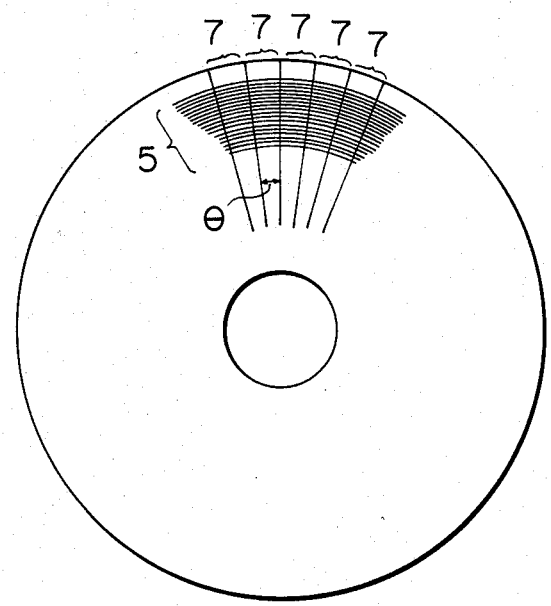
FIG. 4 is a plan view of the recording medium used in the present invention.

Description will now be made of the basic construction of the recording medium 1 used in the present invention, FIGS. 3 and 4 show an enlarged perspective view and a plan view, respectively, of the recording medium 1. The recording medium 1 is formed by a substrate 3 such as plastic or glass and a magneto-optic material 4 such as GdTbFe, GdDyFe or GdFeCO. A plurality of recording areas 7 each having an address number area 6 on which the address number is recorded are provided on each signal track 5. Assuming that N recording areas 7 are provided on a signal track 5, if the recording areas 7 are expressed in terms of an angle $\theta$, the angle $\theta$ is in the relation that $\theta=2\pi/N$, and also it is desirable that the length of the recording areas 7 be determined so that information corresponding to one line during the ordinary original reading and scanning can be recorded therein.

Figure 5A:
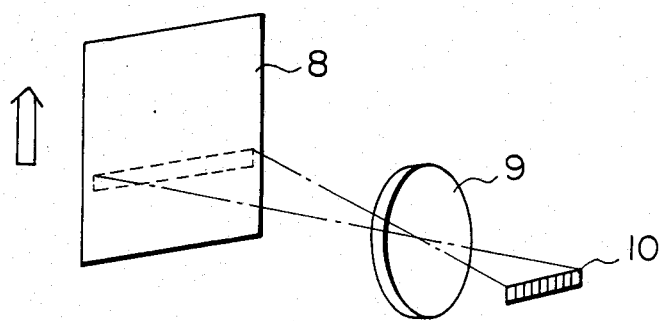
FIGS. 5A, 5B and 5C are schematic views showing an embodiment of the components of the information recording-reproducing apparatus of the present invention.
Figure 5B:
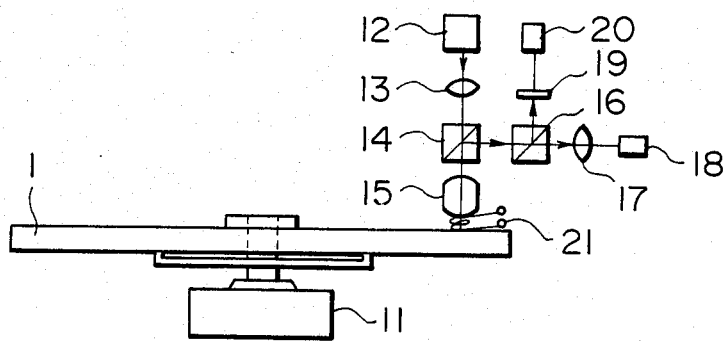
Figure 5C:
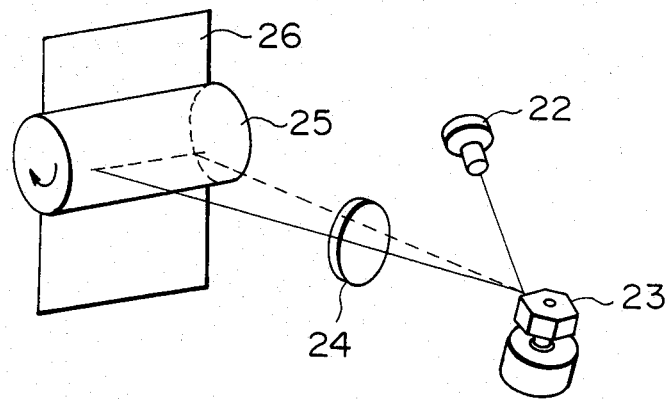

FIG. 5 shows an example of the components of the information recording-reproducing apparatus of the present invention. FIGS. 5A, 5B and 5C schematically show an original reading system, an information recording-reproducing system and a hard copy system, respectively. In FIG. 5A, reference numeral 8 designates an original, reference numeral 9 denotes a lens, and reference numeral 10 designates a line sensor such as, for example, a charge coupled device.

The original 8 and the line sensor 10 are disposed in an imaging relationship by the lens 9, and the original 8 is moved upwardly as indicated by the arrow, whereby the information of the original 8 is read by raster-scanning by the line sensor 10. In FIG. 5B, reference numeral 11 designates a motor for rotatively driving the recording medium 1; reference numeral 12 denotes a semiconductor laser; reference numeral 13 designates a collimation lens system for shaping the light flux distribution; reference numeral 14 denotes a beam splitter; reference numeral 15 designates an objective lens for stopping down the light flux into a minute spot on the recording medium 1 and imaging it; reference numeral 16 denotes a beam splitter for dividing the reflected light into two; reference numeral 17 designates an astigmaic lens system; and reference numeral 18 denotes a four-division photo-detector which serves as both a signal detecting system for automatically controlling the focus of the conventional objective lens 15 and a tracking control signal detecting system for receiving the diffracted light from the grooves of the recording medium 1. Reference numeral 19 designates an analyzer; reference numeral 20 denotes a photodetector for detecting a reproduction signal resulting from a recorded signal being reproduced by the magneto-optic effect; and reference numeral 21 designates a coil provided between the objective lens 15 and the recording medium 1. The coil 21 may produce a bias magnetic field and may also produce a magnetic field for erasing the recording signal.

Initially, the upward and downward directions of the magnetic section of the recording medium 1 are made uniform. A DC current is caused to flow so that a magnetic field with an intensity such that the magnetic sections are not inverted is applied in the direction opposite to the direction of the magnetic sections. The semiconductor laser 12 is modulated and caused to emit light by a signal to be recorded and the light of the laser 12 is applied by way of the collimation lens system 13, the beam splitter 14 and the objective lens 15, whereby the recording medium 1 is heated to a temperature above the Curie temperature. In the portion to which the minute spot has been applied, magnetization disappears due to this heat and, when the recording medium 1 becomes cold by being dragged by the magnetic field of the coil 21, there is created a magnetic section pattern in the direction opposite to its initial direction. In the upward or downward direction of these magnetic sections, information signals are recorded on the recording medium 1.

During signal reproduction, the output intensity of the semiconductor laser 12 is weakened and the laser is caused to continuously emit light. By the output intensity of the laser 12 being weakened, the recording medium 1 is not heated to a temperature above the Curie temperature. The reflected light from the recording medium 1 is subjected to the well-known magneto-optic effect (the Kerr effect) and the plane of polarization of the light flux is rotated by the Kerr rotational angle $\pm\theta k$ dependng on the upward or downward direction of the magnetic sections. This rotation of the plane of polarization is converted into light-and-dark modulation by the analyzer 19 and a reproduction signal is detected by the photodetector 20.

In FIG. 5C, reference numeral 22 designates a semiconductor laser modulated and emitting light in accordance with the reproduction signal from the recording medium 1; reference numeral 23 denotes a light deflector such as a polygon mirror; reference numeral 24 designates an f-$\theta$ lens; reference numeral 25 denotes a drum to which a photoconductive substance such as cadmium sulfide is applied; and reference numeral 26 designates hard copy paper.

By the modulation and light emission of the semiconductor laser 22, the light flux raster scanning of the light deflector 23 and the rotation of the drum 25, the latent image of the information which it is desired to make into a hard copy is formed on the drum 25. Toner or the like is caused to adhere to the drum 25 and the toner is transferred to the paper 26, whereby there can be obtained a visualized hard copy.

Figure 6:
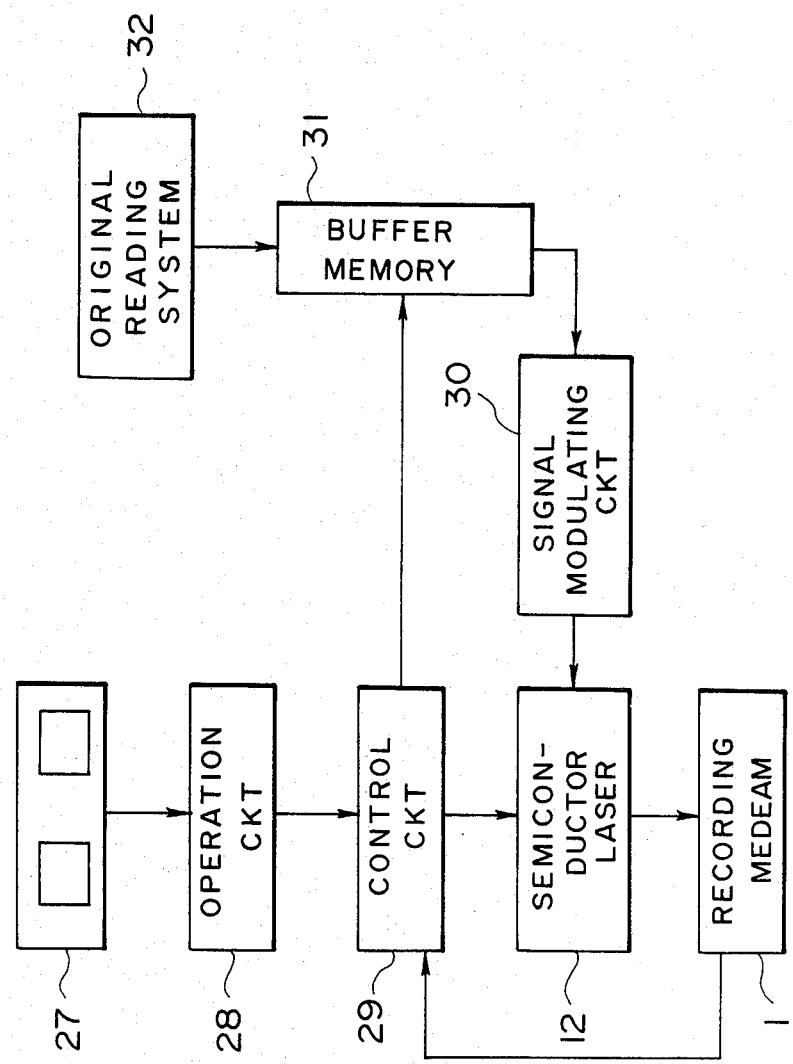
FIG. 6 is a block diagram showing an embodiment of the signal processing system of the information recording-reproducing apparatus of the present invention.

FIG. 6 is a block diagram showing the signal processing system of the information recording-reproducing apparatus of the present invention. Reference numeral 27 designates a select key for selecting one of the aforementioned two examples of the output. Reference numeral 28 denotes an operation circuit for operating the address stored in the recording medium 1 for each line; reference numeral 29 designates a control circuit for causing the semiconductor laser 12 to emit light continuously or in a modulated manner by a signal modulating circuit 30, reading the address number of the recording medium 1 and imparting a sweep instruction to a buffer memory 31; and reference numeral 32 denotes an original reading system as shown in FIG. 5A. The information once read is accumulated in the buffer memory 31.

Description will now be made of the operation required until information is made into a hard copy in a desired output format by the combination of the systems described above in connection with FIGS. 3 through 6. Description will first be made of the operation when the output format as shown in FIG. 1 is selected by the select key 27.

In the operation circuit 28, the address numbers of the recording areas 7 stored in the recording medium 1 are operated for each read line of the originals A-D. It is to be understood that the address numbers are assigned as 001, 002, 003, 004, ..., N, (N+1), ... 2N, (2N+1) from the outer signal track 5. It is also to be understood that reading is effected with each of the originals A-D being scanned M times. The information obtained by the first scanning of the original A is stored in the recording area 7 of address number 001; the information obtained by the second scanning is stored in the recording area 7 of address number 003, the information obtained by the third scanning is stored in the recording area 7 of address number 005, ...; and the information obtained by the Mth scanning is stored in the recording area 7 of address number (2M−1). Also, operation is effected so that the information obtained by the first scanning of the original B is stored in the recording area 7 of address number 002; the information obtained by the second scanning is stored in the recording area 7 of address number 004, ...; the information obtained by the Mth scanning is stored in the recording area 7 of address number 2M; the information obtained by the first scanning of the original C is stored in the recording area 7 of address number (2M+1); the information obtained by the second scanning is stored in the recording area 7 of address number (2M+3); the information obtained by the third scanning is stored in the recording area 7 of address number (2M+5), ...; the information obtained by the Mth scanning is stored in the recording area 7 of address number (4M−1); the information obtained by the first scanning of the original D is stored in the recording area of address number (2M+2); the information obtained by the second scanning is stored in the recording area of address number (2M+4), ...; and the information obtained by the Mth scanning is stored in the recording area of address number 4M. The information is supplied to the control circuit 29.

In the control circuit 29, the semiconductor laser 12 is first caused to continuously emit light at a weak output intensity, and then an address number is read from the address number area 6 of the recording medium 1 and a sweep instruction is imparted to the buffer memory 31.

The buffer memory 31 uses two line memories, and the information obtained in the original reading system 32 by the odd-number scannings is accumulated in the first line memory and the information obtained by the even-number scannings is accumulated in the second line memory.

Figure 7:
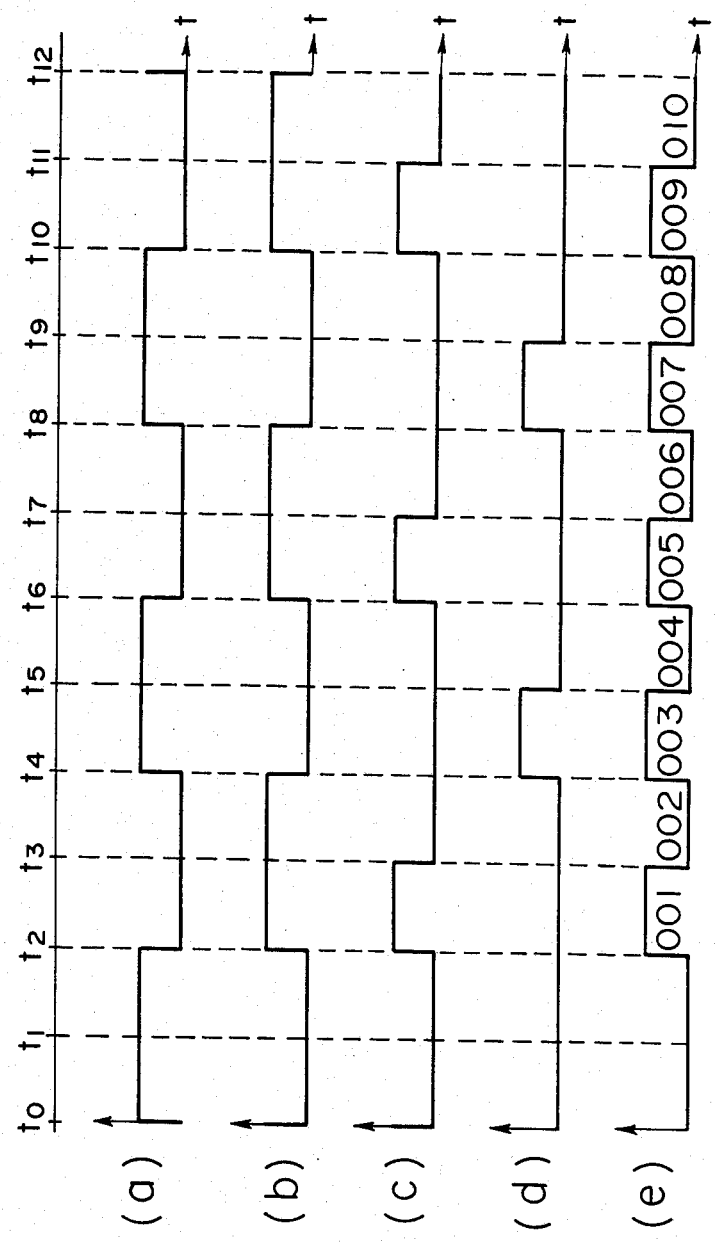
FIGS. 7(a), (b), (c), (d) and (e) are timing charts illustrating the process of information recording in the information recording-reproducing apparatus according to the embodiment of the present invention.

FIG. 7 shows the accumulation of the information in the buffer memory 31, the sweep time relation and the relation with the address numbers of the recording medium 1. Assuming that the originals A-D are continuously read, in the first line memory, as shown in FIG. 7(a), the information obtained by the first scanning is accumulated at time $t_0$-$t_2$, the information obtained by the third scanning is accumulated at time $t_4$-$t_6$, ...; and in the second line memory, as shown in FIG. 7(b), the information obtained by the second scanning is accumulated at time $t_2$-$t_4$, the information obtained by the fourth scanning is accumulated at time $t_6$-$t_8$, ....

Assuming that the recording medium 1 also is continuously rotated when the originals are read, the recording areas 7 pass below the spot of the laser light at substantially equal time intervals. The address numbers read are sent to the control circuit 29, which in turn causes the information to be swept from the buffer memory 31 in accordance with the address numbers at half the time in which the information has been accumulated. That is, as shown in FIG. 7(e), when the address number 001 has been detected, the information is caused to be swept from the first line memory during the time $t_2$-$t_3$ shown in FIG. 7(c), and when the address number 003 has been detected, as shown in FIG. 7(d), the information is caused to be swept from the second line memory during the time $t_4$-$t_5$. Thus, the information of the first original A is subjected, for example, to digital signal modulation by the signal modulating circuit 30 and the semiconductor laser 12 is modulated and caused to emit light, whereby said information is recorded in the odd-number recording areas 7. That is, recording is effected in such a manner that the information obtained by the first scanning of the original A is recorded at the address number 001, the information obtained by the second scanning is recorded at the address number 003 and the information obtained by the third scanning is recorded at the address number 005. Also, the information of the original B is recorded in the even-number recording areas 7. That is, recording is effected in such a manner that the information obtained by the first scanning of the original B is recorded at the address number 002 and the information obtained by the second scanning is recorded at the address number 004. The information of the original C is recorded in the odd-number recording areas 7 after those in which the information of the original A has been recorded, and the information of the original D is recorded in the even-number recording areas 7 after those in which the information of the original B has been recorded.

The information thus recorded on the recording medium 1 is continuously reproduced and the detection signal is demodulated, whereafter in the hard copy system of FIG. 5C, the originals A-D can be made into hard copies in a desired format.

Instead of making hard copies, search may be effected while putting out each four originals in a similar output format on the screen of a display device, not shown, and when desired information is located, only that original may be hard-copied on a sheet of paper.

Thus, the information is recorded on the recording medium 1 while being divided in a form which facilitates search, and during reproduction, the information is continuously reproduced along the signal track 5 and therefore, a continuously driving device can be used for all of the original reading system, the information recording-reproducing system and the hard copy system. Thus, in accordance with the information recording-reproducing method of the present invetion, the output as shown in FIG. 1 which enables quick search can be obtained easily.

Figure 8:
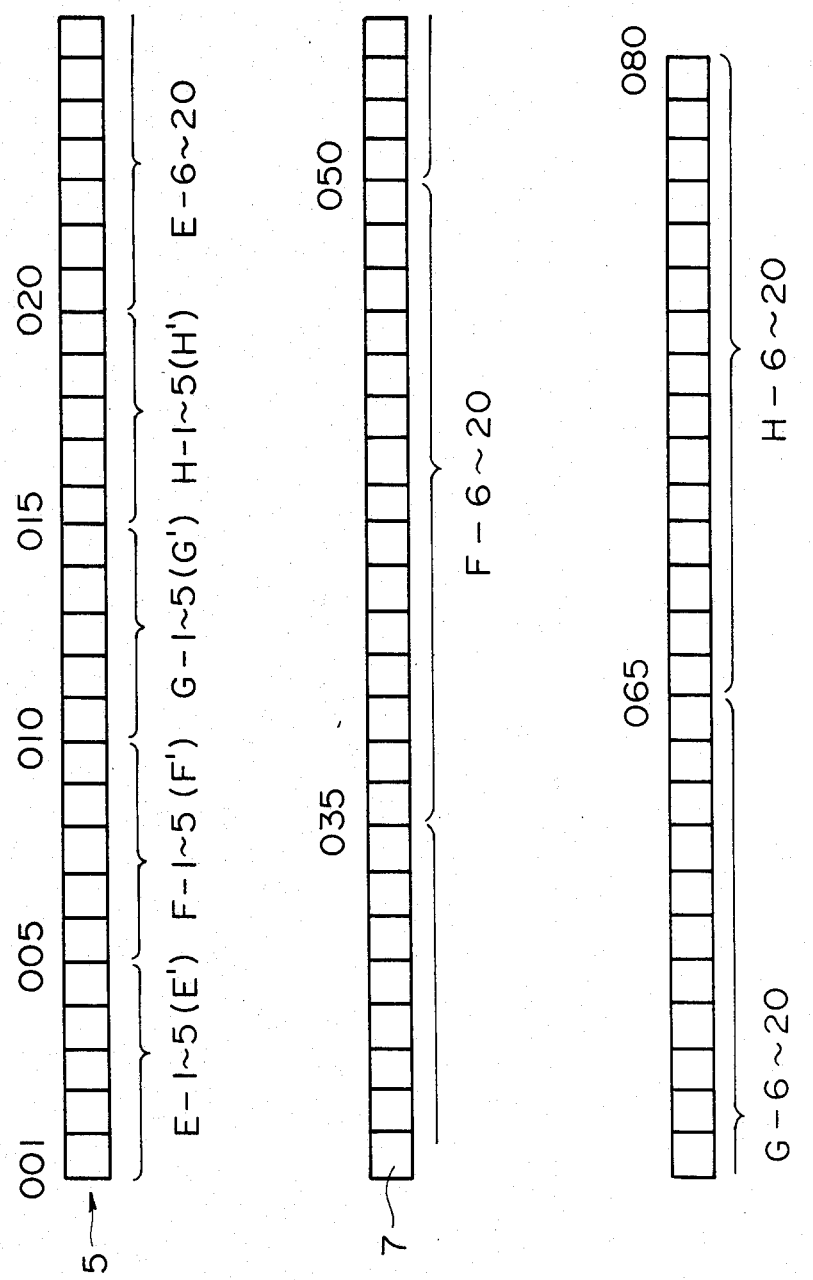
FIG. 8 is a schematic view illustrating the information recording format on the recording medium when the output shown in FIG. 2 is obtained.

Reference is now made to FIG. 8 to describe the operation when the output format shown in FIG. 2 is selected by the select key 27. It is to be understood that an amount corresponding to five lines of each original E-H is put out and that the total number of lines of the originals E-H is 20 lines. As shown in FIG. 8, the first line to the fifth line (E') of the first original E are recorded at address numbers 001-005, the sixth line to the twentieth line are recorded at address numbers 021-035, the first line to the fifth line (F') of the original F are recorded at address numbers 006-010, the sixth line to the twentieth line are recorded at address numbers 036-050, the first line to the fifth line (G') of the original G are recorded at address numbers 011-015, the sixth line to the twentieth line are recorded at address numbers 051-065, the first line to the fifth line (H') of the original H are recorded at address numbers 016-020, and the sixth line to the twentieth line are recorded at address numbers 066-080.

Description has been made with four originals E-H taken as an example, but assuming that there are, for example. N originals each comprising L lines and that M lines of each original are divided and put out, recording is divisionally effected in such a manner that the first original is recorded at address numbers $1-M$, $N \times M + 1 - N \times M + (L-M)$, the second original is recorded at address numbers $M+1-2M$, $N \times M + (L-M) + 1 - N \times M + 2(L-M)$, and the Nth original is recorded at address numbers $(N-1)M + 1 - N \times M$, $N \times M + (N-1)(L-M) + 1 - N \times M + N(L-M)$.

During reproduction, the information is reproduced along the signal track 5. After a desired original has been located from the picture plane 2 shown in FIG. 2B, the address number thereof is read and the address number of the recording area 7 at which the continuation thereof is recorded is read and these address numbers are joined together, whereby the entire desired original is displayed on the picture plane 2 or made into a hard copy.

After a cycle of operation has been terminated, a magnetic field may once be applied to the recording medium 1 by the coil 21 to thereby erase the information signal and a newly desired format may be selected, whereby a similar operation can be effected as frequently as desired.

The foregoing description has been made with respect to the recording medium 1 having the address number areas 6 and tracking grooves, but where a magneto-optic material is used as the recording material, the following method of manufacturing the recording medium 1 is desirable from the viewpoints of the cost of the recording medium and the cost of the apparatus. That is, a magneto-optic material is erasable and thus repetitively usable and therefore need not be removed. Accordingly, an amorphous magneto-optic material is made on the substrate 3 as by spattering or evaporation, and then it is fixed to a turntable. Subsequently, a laser light of strong output intensity is applied to the amorphous magneto-optic material to crystalize it, and address numbers are recorded in the recording areas 7. The crystalized portions have their reflection factor varied and become unerasable and thus become permanent like address numbers recorded in the form of concavo-convexity. Also, the recording medium 1 need not be removed, and this eliminates the problem of eccentricity and enables the tracking control system to be eliminated.

As the output format in the information recording-reproducing method of the present invention, any other format than the above-described embodiment can also be adopted if it puts out the information (or part of the information) from a plurality of information sources to a single display surface or a hard copy. Correspondingly, the recording format on the recording medium will be suitably changed. The recording medium 1 may desirably use an erasable material such as a magneto-optic material because it permits change of the recording format in accordance with the content of information but may also use other materials which permit optical recording and reproduction of information; (for example, metals such as Te and Bi and compounds thereof and polymers having coloring matters, foaming agents or the like added thereto). Also, the information recording-reproducng method of the present invention can be used not only for the aforedescribed optical recording-reproduction, but also for the recording-reproduction of magnetic discs using a magnetic head. Further, the form of the recording medium is not limited to a disc-like form, but the present invention is also applicable to a tape-like form, a drum-like form or a card-like form.

In the information recording-reproducing apparatus of the present invention, various modifications other than the above-described embodiment are possible. For example, the information to be recorded is not limited to the information of documents such as originals but may also be code information such as the output of a computer and in this case, the original reading system will be replaced by an interface or the like with various information instruments or extraneous apparatus. Also, as the output means, a wide range of application is possible from soft copies such as CRT or liquid crystal display device (LCD) to hard copies by the LBP of the illustrated embodiment or thermo-sensitive recording, ink jet or the like.

The use of the information recording-reproducing method of the present invention will enable desired information to be quickly found out even if use is not made of the search system using titles and an address number list as described with respect to the prior art. Also, if the method of the present invention is used with the above-mentioned search system using titles and an address number list, it will be possible to search necessary information more efficiently. As such a way of use, there would occur to mind various ways such as a way of use in which documents of multiple pages are searched by a pre-registered title and necessary individual documents are located from a plurality of pages being displayed at one time, or a way of use in which when one remembers a title vaguely, the first several pages of a document having a confusing title are successively displayed to thereby locate a desired document. As a matter of course, the present invention is also usable with other search systems.

What I claim is:

1. An information recording-reproducing method comprising the steps of:

dividing each of a plurality of document picture signals, which are sequentially input, into a plurality of portions;

writing said signal portions on a recording medium according to a predetermined format, different from the input sequence, to constitute a signal portion sequence corresponding to a retrieval document picture signal including at least one signal portion of each of said plurality of document picture signals; and reading out said retrieval document picture signal recorded on said recording medium to at least one of display and print out a retrieval document picture corresponding to said retrieval document picture signal.

2. An information recording-reproducing apparatus comprising:

input means for sequentially inputting a plurality of document picture signals;

memory means for storing said signals with each of said signals being divided into a plurality of signal portions;

recording means for writing said stored signal portions on a recording medium;

control means for controlling said recording means such that the recording is effected according to a format constituting a signal which corresponds to a retrieval document picture including at least one signal portion of each of said plurality of the document picture signals; and reproducing means for reading out said signal recorded on said recording medium to at least one of display and print out said retrieval document picture.

3. An information recording-reproducing apparatus according to claim 2, wherein said input means is an original reading system for reading an original as the information source by raster scanning.

4. An information recording-reproducing apparatus according to claim 2, wherein said recording medium is an optical disc.

5. An information recording-reproducing apparatus according to claim 4, wherein said recording medium is a magneto-optic disc.

* * * * *